A. T. KEIPPER.
POULTRY COOP.
APPLICATION FILED SEPT. 21, 1908.
969,285.
Patented Sept. 6, 1910.
2 SHEETS—SHEET 1.
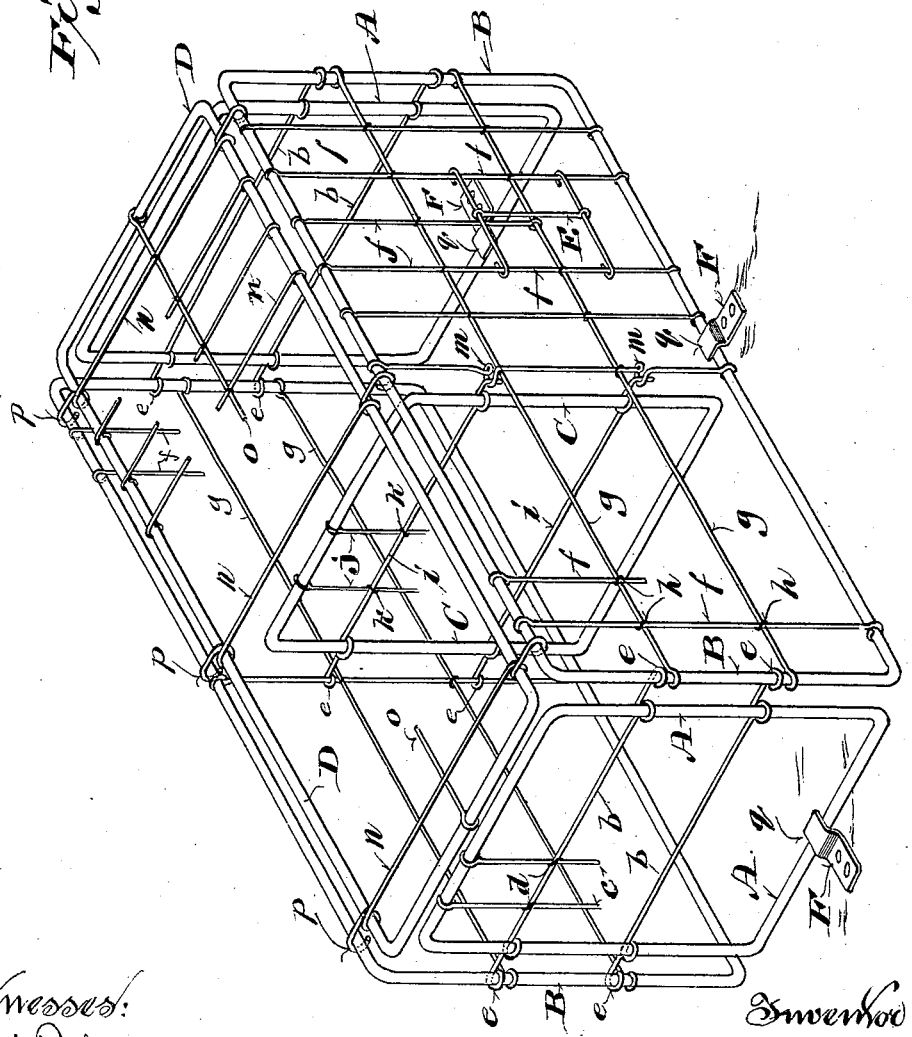

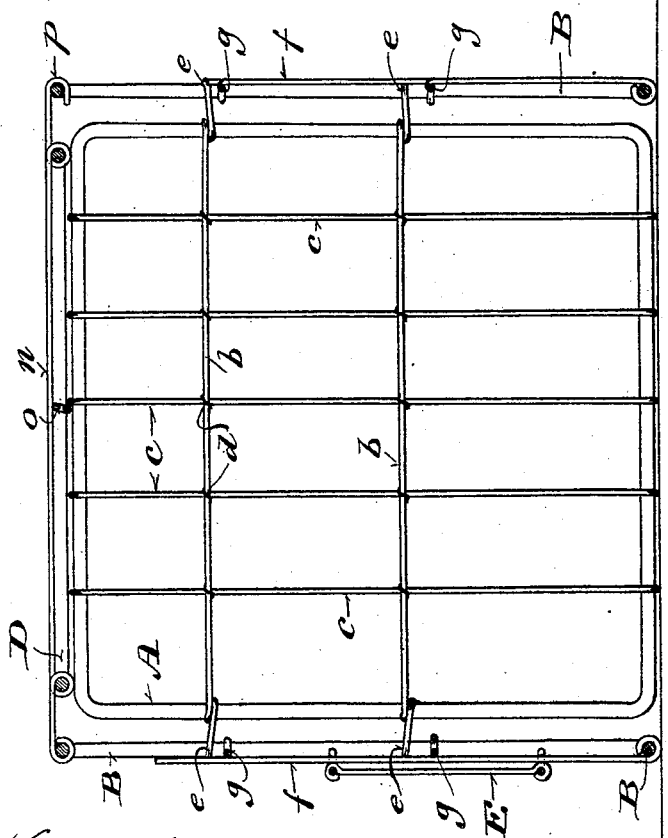

UNITED STATES PATENT OFFICE.

ALBERT T. KEIPPER, OF MILWAUKEE, WISCONSIN.

POULTRY-COOP.

969,285.  Specification of Letters Patent.  Patented Sept. 6, 1910.

Application filed September 21, 1908. Serial No. 454,046.

*To all whom it may concern:*

Be it known that I, ALBERT T. KEIPPER, a citizen of the United States, and resident of Milwaukee, in the county of Milwaukee and State of Wisconsin, have invented certain new and useful Improvements in Poultry-Coops; and I do hereby declare that the following is a full, clear, and exact description thereof.

The invention consists in what is herein shown, described and claimed; its object being to provide simple, economical, light, sanitary and durable all wire knockdown compartment exhibition - coops designed for poultry of various kinds, especially pigeons, which coops are not to be confused with knockdown shipping - crates of common knowledge.

Figure 1 of the accompanying drawings represents a perspective view of an all-wire two-compartment knockdown exhibition-coop in accordance with my invention set up for use, some parts of the same being omitted and others broken away to better illustrate the general construction of said coop. Fig. 2 of said drawings represents a transverse sectional view of the coop.

Referring by letter to the drawings, A indicates each of the ends, B each of the sides, C a partition and D the top of the coop, which coop as a manufacture by itself is bottomless and designed to be set upon an exhibition table, stand, bench or other suitable support and suitably fastened thereto.

Each end of the coop comprises a rectangular frame of suitable gage wire and crossed wires $b$, $c$, of lighter gage attached thereto by bending. Tie wires $d$ are also preferably employed to fasten the crossed wires together at their intersections. The horizontal wires $b$ extend beyond the sides of the frame A and are bent at their ends $e$ on the frames of the coop-sides to be thus in hinge-connection with same.

Each side B of the coop comprises a rectangular frame of wire similar to that employed for the end-frames, and crossed wires $f$, $g$, similar to the ones $b$, $c$, aforesaid. All the crossed wires of the rear side of the coop are fastened at their ends to the corresponding frame, by bending, and they are preferably tied at their intersections. The same is true with reference to a majority of the crossed wires of the front of the coop, but at intervals of said front side a vertical wire $f$ thereof is shorter than the vertical wires adjacent and bent at one end on a horizontal wire $g$, whereby an opening is provided. A closure E for the opening is in the form of a vertical sliding gate comprising connected horizontal and vertical wires, the horizontal wires of this gate being bent at their ends to have loose engagement with vertical wires $f$ of the adjacent coop-side, wherein tie wires $h$ are shown.

The partition C comprises a rectangular frame of wire similar to that employed for the other frames aforesaid, and crossed wires $i$, $j$, the latter being bent fast on the adjacent frame and preferably fastened at their intersections by tie-wires $k$. The horizontal wires $i$ of the partition are extended beyond the sides of the frame to which they are rigidly secured and herein shown bent at one end around a vertical wire of the rear side of the coop to hinge thereon, the other ends being bent in the form of hooks, engageable with horizontal eyes $m$ formed by suitable bending of a vertical wire of the front side of said coop. However it is within the scope of my invention to similarly connect both ends of the horizontal wires of the partition with vertical wires of both sides of the coop.

The top D of the coop comprises a rectangular frame of wire similar to that employed for the ends, sides and partition aforesaid, and crossed-wires $n$, $o$, that are bent fast on the adjacent frame and wire-tied at their intersections. Some of the transverse wires $n$ of the top are extended beyond the sides of the frame to which they are secured and eye - looped loose on the front side-frame, their other ends being bent in the form of a hook $p$ for the engagement of the rear side-frame, as is herein shown.

To hold the coop on an exhibition table, bench or other suitable support, clips similar to the ones F herein shown are preferably employed, each clip being a strip of flat metal provided with apertures for the engagement of fastening nails or screws and suitably bent to form an offset lip $q$ designed to lap the frame of an end or side of the coop.

The coop may be extended indefinitely and provided with a plurality of partitions similar to the one aforesaid in order to divide it into more than two compartments of equal or different length as may be convenient or desirable in practice.

To knock down the coop its top is unhooked from the rear side-frame and swung parallel to the front side-frame, after which this front side-frame, the ends and the partition or partitions are moved in either direction to fold with each other approximately parallel to said rear side-frame in a compact bunch.

I claim:

1. In an all wire knockdown compartment exhibition coop, the combination of ends, sides in hinge-connection with the ends, a partition in vertically sliding hinge-connection with one of the sides and having hook terminals of horizontal wires thereof engageable with horizontal eye-bends with which wires of the other side are provided, and a top in hinge-connection with one of said sides and provided with hooks in which the frame of the other of said sides is caught.

2. In an all wire knockdown-coop, the combination of end, side and top members each consisting of a rectangular frame wire of suitable gage and crossed wires of a lighter gage bent around the frame wire, some of the lighter gage wires of the end members being extended beyond said frame wire and loosely bent on the frame wires of the side members, a top member similar to the members aforesaid having extended wires thereof loosely bent upon the frame wire of one side member and in hook connection with the frame wire of the other side member, and a partition in vertically sliding hinge-connection with one of the sides and having hook terminals of horizontal wires thereof engageable with horizontal eye-bends with which wires of the other side are provided.

In testimony that I claim the foregoing I have hereunto set my hand at Milwaukee in the county of Milwaukee and State of Wisconsin in the presence of two witnesses.

ALBERT T. KEIPPER.

Witnesses:
N. E. OLIPHANT,
GEORGE FELBER.